Jan. 1, 1935.  M. SHOELD  1,986,293
MANUFACTURE OF PHOSPHATE FERTILIZER
Filed July 14, 1931
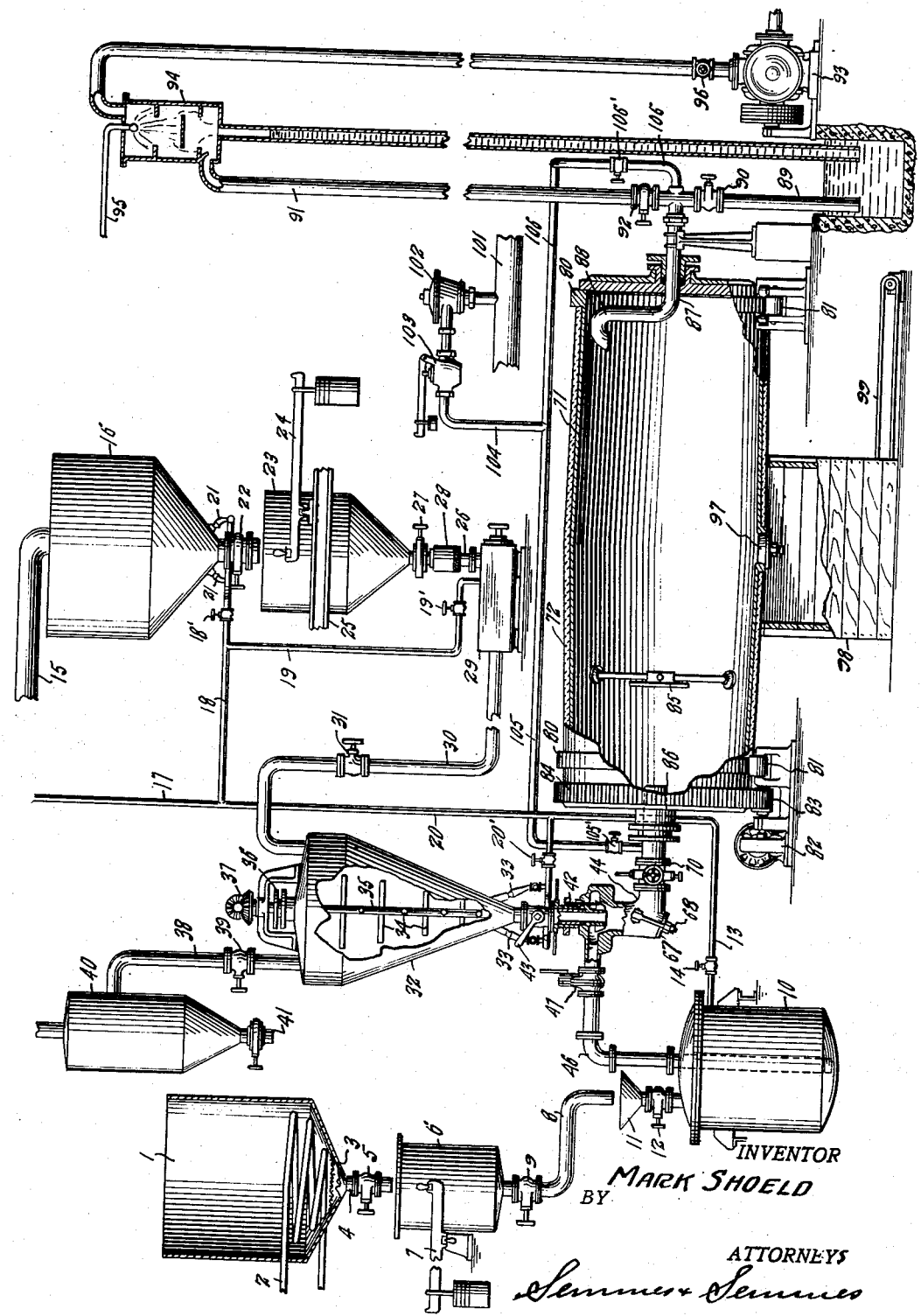
INVENTOR
MARK SHOELD
BY
ATTORNEYS Patented Jan. 1, 1935

1,986,293

UNITED STATES PATENT OFFICE 1,986,293

MANUFACTURE OF PHOSPHATE FERTILIZER

Mark Shoeld, Mount Lebanon, Pa., assignor to The Oberphos Company, Baltimore, Md., a corporation of Maryland Application July 14, 1931, Serial No. 550,785

9 Claims. (Cl. 71—7)

This invention relates to the manufacture of phosphatic fertilizers and more particularly to improved methods of preparing acid phosphate and double superphosphate.

In accordance with the usual methods of preparing acid phosphate, small amounts of sulphuric acid and phosphate rock are mixed in an open mixing pan for a short period of time, and the mixture is then deposited into a den. From the den the accumulated batches of material are removed and are transferred to storage sheds wherein they are allowed to remain until the reactions have run substantially to completion and until the material has attained a condition wherein it may be properly handled and further treated. After the material has cured sufficiently, and which requires a relatively long period of time, it is prepared by further treatment for commercial use. The older processes as outlined above are protracted and expensive, due to the relatively long periods of time necessary for completing the reaction between the acid and the phosphate rock. Due to the reactivity of the ingredients the mixing period is of short duration and consequently the materials are not thoroughly mixed so as to present the maximum reactive surfaces of the phosphate rock to the acid.

Newer methods have recently been developed in which phosphate fertilizers are prepared by reacting the acid and rock in a closed system in which the components of the mass are retained and in which the mass of phosphate rock and acid is continuously agitated during the reaction period. This process differs from the usual older processes in that the time for completing the reaction between the rock and the acid is remarkably of shorter duration than was necessary in the older processes.

A major object of the present invention is to provide a novel process of preparing phosphate fertilizers.

Another object of this invention is to provide a method of manufacturing phosphatic fertilizers in a short period of time.

Yet another object of this invention is to provide a process for preparing phosphate fertilizers in which the reaction between the phosphatic material and acid is carried out under superatmospheric pressure and in the presence of a vapor.

Still another object is to devise a process of preparing phosphate fertilizers which may be carried out in a minimum of apparatus.

With these and other equally important objects in view, the invention comprehends the concept of treating phosphate rock or similar phosphatic material in a finely ground condition with a strong acid in a closed system, and supplying heat to the mass while undergoing reaction in the form of a heated vapor and under such conditions as will insure an improved final product.

The invention further comprehends the treatment of phosphatic material with a strong acid under superatmospheric pressure and in the presence of a saturated vapor.

In order to more clearly explain the invention, an illustration somewhat diagrammatic in form is shown in the accompanying drawing, in which the single figure represents a diagrammatic plan in which the process herein described may be carried out.

In accordance with the present invention, the reaction between the phosphatic material such as phosphate rock and the acid is carried out in a closed system under superatmospheric pressure. The process comprises essentially reacting a mixture of phosphate rock and acid in the closed container and during the reaction passing steam into the vessel under pressure.

By introducing the steam directly into the container in which the reaction is being carried out, heat may be supplied directly to the reacting mass and consequently high thermal economies are effected. By continuously agitating the mass such as by rotation of the container in which the reaction is carried out, the heat will be uniformly distributed to all of the material contained in the container, and thereby the reaction between the acid and the phosphate rock will be accelerated.

The apparatus shown in the drawing, more or less diagrammatically, is suitable for carrying out the present process.

This apparatus includes an acid tank 1 in which acid of any predetermined or desired strength is employed. This is provided with a heating coil 2 which may be connected with any suitable source of heating medium for the purpose of controlling the temperature of the acid to thereby accelerate subsequent reactions in which this reagent is involved. Positioned above the discharge end of the tank is a filter or screen 3 which permits the discharge of a clarified acid for use in the operation. The hot acid is discharged from tank 1 through the line 4 and its flow is controlled by the valve 5.

The hot acid discharges from the tank 1 into an acid scale container 6 which is shown as mounted upon one end of a suitable balance 7 for accurately weighing the amount of acid employed in each charge. The predetermined amount of acid is discharged from the weighing tank 6 through the line 8, controlled by valve 9, into the acid egg or charging tank 10. Provision is made for a displaceable connection between the acid container 6 and the acid egg 10. This is diagrammatically shown in the drawing as including the funnel 11 positioned subjacent the discharge end of the acid pipe 8. Between this funnel and the acid egg is placed valve 12 for the purpose of sealing off the egg to permit retention of pressure therein. Connected to the upper portion of the acid egg is a line 13 controlled by valve 14. This, as will be more fully described, is for the purpose of admitting air or other suitable fluid under pressure so as to provide for a high velocity flow of the acid from the acid egg when the autoclave is to be charged.

Similarly, finely divided phosphatic material, such as phosphate rock dust, is weighed out in predetermined amounts for each charge. The dust unit comprises a line 15 leading from a suitable source of supply and through which finely ground phosphate rock is transferred and deposited in the receiving hopper 16. In order to insure a free and rapid flow of dust through the apparatus air is injected into the dust. As shown, line 17, which is connected with a suitable source of air under pressure, communicates with the branch lines 18, 19 and 20, the flow of air through which is controlled respectively by the valves 18', 19' and 20'. Air under pressure may be admitted through the line 18 into the dust hopper 16 through the injectors 21. In operation, air under five pounds pressure more or less is forced into the material in the dust hopper and out through points in the flow of the dust for the purpose of aerating this dust. This admixture of air with the dust renders it more fluid and permits easy transportation through the system. This dust hopper is provided with a conical bottom, and flow of the dust from the hopper is controlled by the valve 22 positioned in the discharge line of the hopper. Placed below the dust receiving hopper is a container 23 in which the quantity of dust charged to the mixing apparatus is accurately determined by means of the scale 24, which latter is mounted on a fixed support 25. The weighing hopper is provided with a conical bottom which is connected to the discharge pipe 26, and flow of dust through this pipe is controlled by the blast gate 27. To permit displacement of the dust hopper 23 during weighing a slip joint 28 is provided.

The predetermined quantity of dust, which has been aerated in the hopper 16 and weighed in hopper 23, is discharged through the line 26 and picked up by the pneumatic pump 29, and is discharged into the line 30 controlled by valve 31 to the upper part of the dust charging hopper 32. The pump 29 may be of any suitable type which will rapidly transport the dust. In order to insure free flowing characteristics of the dust, air under the stated pressure is injected through the branch line 19.

The dust charging hopper 32 is preferably of frusto-conical shape. At its lower end it is connected through the jets 33 to the air line 20 and flow of air into the hopper is controlled by 20'. The hopper is provided with vanes or paddles 34 mounted upon a central shaft 35, which latter extends through a suitable bearing 36 positioned at the top of the hopper and at its end is connected to a suitable source of power by the connection shown at 37. Communicating with the upper end of the hopper is a vent line 38, controlled by valve 39, which communicates with the dust venting chamber 40. The small amount of dust which settles or collects in the venting chamber may be periodically withdrawn through the valve 41. When filling the dust charging hopper the valves 31 and 39 are opened and the valve 43 is kept closed. During this period of filling the hopper, the paddles remain stationary. When the predetermined amount of dust has been admitted to the hopper and before the charging of the autoclave is commenced, valves 31 and 39 are closed and air is admitted into the hopper through the line 20 by opening the valve 20' and the paddles 34 are caused to rotate. Admission of air under pressure increases flowability of the dust and at the same time the dust is agitated by means of the rotating vanes.

The lower end of the dust charging hopper connects with a special type of charging valve, shown diagrammatically in the drawing and more completely described in application Serial No. 394,130, filed September 20, 1929, by Beverly Ober et al., patented January 3, 1933, No. 1,893,437. This valve is so constructed as to mix and mutually impinge respectively predetermined and constant ratios of acid and dust. As shown on the drawing, the valve communicates with the acid egg 10 through the line 46 which is controlled by the quick opening valve 47. The acid is forced rapidly through the pipe 46 by means of the positive pressure applied upon the surface of the acid by the high pressure gas admitted through line 13. Flow of dust from the dust hopper to the mixing device is controlled by a quick opening valve 43. The discharge end of the valve 42 communicates with an elbow 44 which is provided with a detachable section 67 for the purpose of cleaning.

The mixing device, indicated diagrammatically in the drawing by the numeral 42, comprises means to cause a substantially conoidal stream of acid to enclose and encompass a stream of dust under high conditions of flow and turbulence. The element also has relatively movable parts so as to permit adjustment and regulate the quantity of acid flowing therethrough with respect to the quantity of dust.

Provisions are made in the valve to cause the acid to flow downwardly in the form of a cone or spray which contacts with the dust. This preferably may take the form of a vertically adjustable valve member 45 which, upon vertical displacement, varies the opening between the circular induction channel and the valve seat 46 to regulate the thickness of the film of acid which impinges upon the dust, and to regulate the speed of the acid through the mixing device.

At its lower end the mixing device is provided with a closure member 67, held in place by any suitable locking means 68. This member may be removed to clean out the spout section. This provides for a ready inspection and cleaning of the interior of the valve. This construction, therefore, permits the admixing, in transit and under conditions of high speed of flow, of predetermined and constantly maintained ratios of dust and acid.

Interposed in a line between the mixing valve and the autoclave is a gate or semaphore valve 70. This valve is constructed so as to permit quick opening and shutting and functions to seal off the autoclave from the charging end of the system so as to provide for the establishment of a vacuum therein or to open communication between the charging system and the autoclave to provide for the rapid passage of the compounded mixture of dust and acid. This valve is disclosed in application Serial No. 393,791, filed September 19, 1929, by Pagon et al., patented October 31, 1933, No. 1,933,182.

From the description given thus far it will be seen that the apparatus described provides for the segregation of regulated quantities of acid and dust and the novel admixture of these two materials under conditions of rapid movement and maintained ratios.

The acid and rock dust compounded or mixed in the mixing valve is charged to the autoclave 71. While the size and construction of this autoclave may be varied, it is preferred to use a horizontal rotary autoclave lined with some acid resistant material such as lead and insulated or lagged with any material which serves to retard the transfer of heat. As shown in the drawing, the autoclave is covered with insulating material 72.

The autoclave is mounted for rotation upon its horizontal axis in any suitable manner, as by the roller rings 80 and cooperating roller bearings 81 positioned at suitable portions of the autoclave. Rotation is imparted to the autoclave by means of a suitable source of power, such as the motor 82, the driving gear 83 and ring gear 84. The interior of the autoclave is provided with a baffle plate 85 positioned in line with the discharge pipe 86, the purpose of which is to spread out the charge and prevent any of the acid and rock mixture from being taken out of the autoclave through the discharge line. At the other end the autoclave is provided with a pipe 87 formed with a goose neck 88 and which is mounted within the hollow shafts of the autoclave. On its exterior this pipe communicates with the blow-down line 89 controlled by valve 90, and also with a vapor line 91 controlled by valve 92. The vapor line 91 communicates with a vacuum pump 93 by way of an absorption system, shown as the spray tower 94. A suitable condensing medium such as water is admitted to the tower through the line 95. Communication between the autoclave and the vacuum pump is controlled by means of the valve 96, as well as the valve 92.

For the purpose of discharging the contents of the autoclave a manhole cover 97 is provided. Positioned below the center of the autoclave is a bin 98 in which the contents of the autoclave may be deposited. Associated with this bin is a conveyor 99 by means of which the product discharged from the autoclave may be transported to grinding machinery or to any other portion of the plant to subsequently be treated. For the purpose of facilitating discharge, the autoclave is preferably constructed on a double taper having ends of relatively small diameter and a center section of large diameter.

In order to supply steam to the autoclave herein described, connections are made with a steam main 101 which in turn communicates with a source of steam or steam generator. Steam may be drawn from the main 101 through the steam regulator 102 and safety blow-off valve 103 to the line 104. Branches of this line are connected respectively to the charging end by way of branch conduit 105 and to the vacuum end of the autoclave by way of branch conduit 106. Flow of steam through the branch conduits 105 and 106 is controlled respectively by the valves 105' and 106'. With this type of apparatus, steam may be injected either into the charging end or into the vacuum end, or both ends of the autoclave simultaneously.

From the prior description of the elements of the apparatus and steps of the process, the operation will be understood. When it is desired to manufacture a mass of acid phosphate, double superphosphate, or any fertilizer mixture, the autoclave is first sealed off from the charging end of the system by closing the valves 43 and 47. Predetermined amounts of hot acid and dust may be weighed out in the acid and dust weighing hoppers and charged thence to the acid egg 10 and dust receiving hopper 32, respectively. During current operations, the filling of the dust hopper and acid egg may be carried out while a previous batch is being processed in the autoclave. After the acid has been charged to the acid egg, valve 12 is closed and valve 14 is opened to put a positive pressure on the acid in the acid egg. To do this, air is admitted through line 13 under approximately 90 lbs. pressure.

In the preferred method of operation, a partial vacuum is maintained in the autoclave during the charging period. For this purpose, therefore, valves 92 and 96 are opened and valves 43, 47 and 90 are kept closed. The vacuum pump 93 is operated to draw a vacuum upon the autoclave. The mixing valve 42 may be adjusted, as described above, to respectively proportion the quantities of dust and acid. This adjustment preferably is made so that the flow of acid commences just slightly before the flow of dust, and continues for a very short period after the flow of dust, so that the flow of liquid acid through the lines serves to clean out the charging pipe.

When the desired vacuum in the autoclave is obtained, the autoclave is set in rotation by starting the motor 82. If desired, however, the autoclave may be started at the very beginning of the operations. The vacuum at the beginning of the charging operation is about 25 inches and at the end about 10 inches. The predetermined amount of dust which has been weighed out and deposited in the hopper 32 is aerated by admitting air through the jets 33 and agitated by rotating the vanes 34. At this time the valves 31 and 39 are closed. To charge the materials to the rotating autoclave the valves 43 and 47 are opened wide quickly and simultaneously. Under the influence of the pressure on the acid and rock dust and the reduced pressure in the autoclave, dust flows out of the dust hopper 32 through the valve 43 and is therein encompassed by a conoidal stream of acid which enters preferably tangentially into the valve. The acid and dust are compounded or mixed in the charging valve as described, and passed through the spout section of the charging device in which its direction of flow is deflected and by reason of which an added turbulence is given to the mass. This mixture then passes through the open valve 70, through the charging pipe 86, and impinges forcibly upon the baffle plate 85. During this charging, as noted, the autoclave is maintained in rotation and the mass is further mixed by impact on the baffle plate and by the rotation of the autoclave. The baffle plate furthermore serves to prevent any of the charging mixture from passing to the goose neck 88 and being drawn out through the vacuum line. In ordinary operation from about 1 to 1½ minutes is required to discharge the contents of the dust hopper and acid egg into the autoclave.

While the size of the elements and capacity of the elements may be varied, it has been found that an autoclave from 5 to 8 feet in diameter and from 15 to 20 feet in length serves very effectively. When employing an autoclave 6 feet in diameter and 20 feet in length, it may be charged within the stated time, namely, from about 1 to 1½ minutes, with approximately five tons of material. During the charging period the vacuum pump is maintained in operation and the autoclave is continuously rotated. While the rate of rotation of the autoclave may be increased or decreased within wide limits, it is preferred to maintain the rotation about from 5 to 15 R. P. M., and preferably at about 6 R. P. M.

After all the material in one batch has been charged to the autoclave, the valves 70 and 92 are closed, thereby sealing off the autoclave and the vacuum pump is temporarily stopped.

The present invention consists in passing steam in a continuous stream and under superatmospheric pressure into the autoclave 71 which is maintained at a pressure preferably above atmospheric. Under these circumstances, steam may be admitted to the autoclave either through the lines 105 or 106 by opening the valves 105' and 106', respectively, until the predetermined superatmospheric pressure is obtained in the autoclave.

In order to utilize to the full the heat units in the steam, the steam may be introduced and withdrawn intermittently so as to displace the permanent gases to a large extent and to increase partial pressure of the steam for any given absolute pressure.

In this type of operation it has been found that the best results are secured by introducing the steam during the digestion period through the vacuum end, namely, through the line 106. This method of introducing the steam, besides giving the desired pressure and insuring the requisite temperature, serves the additional function of maintaining the vacuum pipes in a clean condition.

This type of operation also has other advantages. A considerable quantity of the steam which is introduced during the operation is condensed in the autoclave and provides water which may be utilized as water of dilution for the acid, and hence, when operating with this process, it is possible to utilize a stronger acid in the charge. As a result of this use of a strong acid and then diluting the acid within the autoclave, additional heats are developed, due to the latent heat of the steam and heat of dilution of the acid, which are generated in situ and are utilized, to a maximum degree, for accelerating the conversion reactions and also for building up the sensible heat of the mass.

As a modification of the present invention, predetermined amounts of acid and dust may be charged through the autoclave, through the line 86. It is advisable on the first run to inject steam for a short period of time into the autoclave through either line 105 or 106 for the purpose of raising the temperature of the autoclave.

After the material has been charged to the rotating autoclave this latter is sealed off by closing the valves 43, 47, 90 and 92, and then saturated steam at from 100 to 300 lbs. pressure more or less is introduced through the goose neck 88 by way of the line 106 into the container. During this introduction of steam the valve 105' is closed and valve 106' is opened. In the preferred operation preferably the steam is injected for a period of time sufficient to build up the internal pressure in the autoclave to about 50 or 60 lbs. The steam is then turned off and the pressure released to about 30 lbs. This may be done by shutting the valve 106' and opening the valve 90 and allowing excess pressure to blow off through the line 89. After reduction of pressure to the desired lower degree, the valve 90 is then closed and valve 106' again opened to admit further quantities of steam. The valve 106' may be retained in open position until the internal pressure in the autoclave is built up to about 60 lbs. This type of operation has proved to be very satisfactory. By admitting steam initially into the autoclave during the earlier stages of digestion a considerable quantity of heat units is admitted and the strong acid used in the charge is diluted by the water which is condensed from the steam. Heat of condensation and of dilution is, therefore, generated in situ in the mass. This process, involving first building up the pressure in the autoclave with steam and then blowing this off and later adding more steam, has the advantage of markedly increasing the partial pressure of the steam during the major part of the digestion period and therefore carrying in a considerably greater quantity of heat units for a given absolute pressure.

While in the preferred operation it is suggested to first build up the pressure by injecting steam and then releasing the pressure to diminish the quantity of permanent gases and then building up this pressure again largely with steam, this intermittent operation is not necessary. It has been found that the process may be operated satisfactorily and an improved product obtained by first injecting steam during the digestion period and maintaining the pressure therein at a predetermined desired high value without any blow-off period. Similarly, in lieu of admitting steam through the goose neck 88, it may be admitted through the line 105, or again it may be admitted simultaneously through the line 105 and through the goose neck 88.

It has been found that with this type of operation higher concentrations of acid may be employed. For example, the process operates satisfactorily with concentrations ranging from 52° Bé. acid to 57° Bé. acid. This type of operation also permits the use of a lower acid temperature than in the case of the operation involving an externally heated autoclave. In operating with this type of process the quantity of steam actually admitted may, of course, be varied through relatively wide limits. The quantity which is desired depends upon the amount of heat which it is found necessary for proper operations with any given type of rock and acid concentrations. As a general proposition sufficient steam should be introduced to furnish enough condensed water to reduce the acid concentration down to 52 or 53° Bé. For example, in using a 10,000 lb. charge to an autoclave and starting with a 55° Bé. acid at between 90 and 110° F., approximately 200 lbs. of saturated steam at 80 to 100 lbs. pressure would be suitable to reduce the acid concentration from 55 to 53° Bé. and to furnish sufficient heat to the mass to accelerate the reactions during digestion and to provide sufficient sensible heat to insure satisfactory drying upon subsequent vacuumizing of the product.

Briefly, therefore, applicant's process comprises charging predetermined quantities of finely ground rock and a strong acid to the heated and rotating autoclave. Preferably a preliminary vacuum is pulled on the autoclave to facilitate charging in a manner described hereinbefore. After the mass has been charged to the autoclave the valves 43, 47; 90 and 92 are closed and steam admitted through the line 106 and/or 105 into the autoclave for the purpose of supplying heat units and also sufficient condensed water to cut down the concentration of the acid to the desired degree. This introduction of steam may be continued for a portion of the digestion period or throughout the entire digestion period or, as described, steam may be introduced and then blown off and fresh steam reintroduced for the purpose of diminishing the partial pressures of the fixed gases within the element. After digesting the mass in a rotating autoclave for one-half hour, more or less, the generated pressures are blown off by opening the valve 90. After the pressure has been reduced to atmospheric the valve 90 is closed and valves 92 and 96 opened and the vacuum pump set in operation to draw a vacuum upon the rotating autoclave. In these circumstances, due to the fact that the material is substantially completely reacted and that the exothermic heats of reaction and the additional heat units added by means of the steam are retained, the product is satisfactorily dried under the reduced pressures. During the drying period, the rotation of the autoclave is continued and the vacuum pump is operated at from about 25 to 29" for a period of from 25 to 40 minutes.

The following examples illustrate the efficacy of this type of process:

A 10,000 lb. charge of material on the basis of an 88-100 acid dust ratio (calculated at 52° Bé. H$_2$SO$_4$ but using 55° Bé. acid) was charged to the rotating autoclave. This material was digested in the rotating autoclave for a period of 35 minutes. At the beginning of the digestion period, steam at from 100 to 110 lbs. pressure was injected through the goose neck 88 for a period of 20 minutes. During the digestion period the temperature in the autoclave was maintained at from 260 to 280° F. and the maximum pressure in the autoclave was 60 lbs. From about 110 to 155 lbs. of steam was used in this operation. After the digestion period of 30 minutes, pressures were blown off by opening the valve 90 and the material was vacuumized while continuing the rotation for a period of approximately one-half hour. This material was then dumped and after 48 hours was analyzed and showed the following:

| | Percent |
|---|---|
| Moisture | 3.15 |
| Total P$_2$O$_5$ | 21.11 |
| Insol. P$_2$O$_5$ | 1.74 |
| Avail. P$_2$O$_5$ | 19.37 |
| Free acid | 4.4 |
| Acidulation | 91.3 |

Another typical operation involving the principles above set forth was carried out in which 10,000 lb. charge was charged to the autoclave, using the same type of rock and concentration of acid. After the material was charged steam was injected through the goose neck 88 until the pressure within the autoclave reached 60 lbs. The steam was then turned off by closing valve 106' and the internal pressure was reduced to 30 lbs. by blowing off through the line 89. The valve 90 was opened for this purpose. After the pressure was reduced to 30 lbs., valve 90 was closed and steam again injected through the goose neck 88 until the pressure was built up to 60 lbs. The period of time required for the two injections of steam and the blow off period for reducing the internal pressure of 60 lbs. down to 30 lbs. required about 20 minutes. Throughout this time the mass within the autoclave was maintained in continuous rotation. The material was digested for an additional period of approximately 10 minutes, after which time the gases and vapors within the autoclave were blown through the line 89 until the pressure was reduced to atmospheric. The vacuum pump was then connected to the autoclave and operated for a period of approximately 40 minutes. During this vacuumizing, as described herein, the rotation of the autoclave was continued. In this operation from 205 to 230 lbs. of steam were used and the temperature in the autoclave varied from 270 to 280° F. After 48 hours, the product was analyzed and showed the following:

| | Percent |
|---|---|
| Moisture | 3.67 |
| Total P$_2$O$_5$ | 21.11 |
| Insol. P$_2$O$_5$ | 2.20 |
| Avail. P$_2$O$_5$ | 18.91 |
| Free acid | 4.5 |
| Acidulation | 89.6 |

In all of these operations, whether admitting steam for a short period or continuously or intermittently during the digestion, and whether admitting the steam solely through the vacuum end or through the charging end, or through both ends of the autoclave, improved results and the novel improved product were obtained.

By treating the phosphate rock as herein described, a marketable product may be obtained within a treating period of approximately one hour. Obviously this is a considerable improvement over the older methods in which a period of months was necessary in order to produce a product which was sufficiently dry to permit handling and shipping.

Also, it will be appreciated that the present process provides a treatment wherein the reaction product produced by the action of the acid on the phosphate rock may be completely dried within the digester in which the acidulation is carried out and without additional drying procedure.

A surprising feature of the present invention is that even though steam is employed, the product obtained by the herein described treatment consists of a mass of encrusted globoids or nodules of fairly uniform size, of high mechanical strength and low moisture content, and in general is in substantially the same physical condition as a product prepared in a similar process without the use of steam.

Obviously, the herein described process is susceptible of relatively wide variations in conditions of operation within the scope of the disclosure. Therefore, while a preferred process has been described, and specific examples of operation under this process have been given, it is to be understood that these are largely for the purpose of explaining the purpose of the invention and should not be inferred as limitations.

I claim:

1. A process for manufacturing phosphate fertilizer comprising reacting phosphatic material and a strong liquid acid in a confined zone and supplying heat to the mass in the confined zone directly during the reaction period by intermittently introducing and withdrawing steam under superatmospheric pressure to decrease the partial pressure of the permanent gases and increase the partial pressure of the steam while maintaining the mass substantially throughout the reaction period under superatmospheric pressure.

2. A process of manufacturing phosphatic fertilizer comprising simultaneously charging ground phosphate rock and a strong liquid acid to a sealed container, rotating the container continuously during the ensuing reaction, intermittently admitting steam to and withdrawing steam from the container to increase the partial pressure of the steam therein, and maintaining the mass under superatmospheric pressure during the reaction.

3. A process of manufacturing phosphatic fertilizer comprising simultaneously charging ground phosphate rock and a sufficient amount of a strong liquid acid to completely convert the rock, to a sealed container, rotating the container continuously during the ensuing reaction, intermittently admitting steam to and withdrawing steam from the container to introduce heat units to the mass and to decrease the partial pressure of the permanent gases, maintaining the mass under superatmospheric pressure during the reaction, and mechanically agitating the mass during the reaction by introducing sufficient steam.

4. A process of manufacturing phosphatic fertilizer comprising applying a vacuum to a confined space, subsequently injecting ground phosphate rock and an equivalent amount of a liquid acid to said confined space, admitting steam to the confined space withdrawing steam from the confined space together with permanent gases and then reintroducing steam to raise the pressure above atmospheric, and maintaining the space after introduction of the phosphate rock, acid and steam under superatmospheric pressure to effect the reaction between the reacting constituents.

5. A process of manufacturing superphosphate comprising evacuating a rotary autoclave, introducing ground phosphate rock and sulphuric acid into said autoclave, introducing steam into said autoclave, subsequently allowing the pressure in the autoclave to exceed atmospheric pressure then withdrawing steam together with permanent gases so as to increase the partial pressure of steam and then reintroducing additional steam so as to build up the pressure, mechanically agitating the mass in the autoclave to effect the reaction between the acid and phosphate rock, and so adjusting the concentration of the acid added to the autoclave as to maintain a desired concentration of acid in the autoclave upon condensation of the steam introduced therein.

6. A process of manufacturing phosphatic fertilizer comprising simultaneously charging ground phosphate rock and an acid to a sealed container, rotating the container continuously during the ensuing reaction, intermittently admitting and withdrawing steam to and from the container to materially decrease the partial pressure of the gaseous products of the reaction, maintaining the mass under superatmospheric pressure during the reaction, mechanically agitating the mass during the reaction, and subsequently applying a vacuum to the mixture of acid and phosphate rock, and continuing to agitate the mass to effect drying of the reaction product.

7. A process of manufacturing phosphatic fertilizer comprising applying a vacuum to a confined space, subsequently injecting ground phosphate rock and a liquid acid to said confined space, admitting steam to the confined space, maintaining the space after introduction of the phosphate rock, acid and steam under superatmospheric pressure to effect the reaction between the reacting constituents, increasing the partial pressure of the steam employed during the reaction by displacing gases formed during the reaction with injected steam and subsequently applying a vacuum to the mixture of acid and phosphate rock, and continuing to agitate the mass to effect drying of the reaction product.

8. A process of manufacturing phosphatic fertilizer comprising applying a vacuum to a confined space, subsequently injecting ground phosphate rock and acid to said confined space, admitting steam to the confined space, maintaining the space after introduction of the phosphate rock, acid and steam under superatmospheric pressure to effect the reaction between the reacting constituents, increasing the partial pressure of the steam employed during the reaction by displacing gases formed during the reaction with injected steam, maintaining the mass in a miscible condition during the reaction by mechanically agitating the same, and subsequently applying a vacuum to the mixture of acid and phosphate rock, and continuing to agitate the mass to effect drying of the reaction product.

9. A process of manufacturing phosphate fertilizer comprising evacuating a rotary autoclave, introducing ground phosphate rock and a strong liquid acid into said autoclave, introducing saturated steam into said autoclave then withdrawing steam from the autoclave together with permanent gases and reducing the partial pressure of the permanent gases, subsequently positively increasing the pressure in the autoclave by reintroducing additional steam to cause the pressure to exceed atmospheric pressure, mechanically agitating the mass in the autoclave to effect the reaction between the acid and phosphate rock, and so adjusting the concentration of the acid added to the autoclave as to maintain a desired concentration of acid in the autoclave upon condensation of the saturated steam introduced therein, and subsequently applying a vacuum to the mixture of acid and phosphate rock, and continuing to agitate the mass to effect drying of the reaction product.

MARK SHOELD.